United States Patent Office 3,438,787
Patented Apr. 15, 1969

3,438,787
SUGARLESS CONFECTION
James W. Du Ross, Rolling Park, Claymont, Del., assignor to Atlas Chemical Industries, Inc., Wilmington, Del., a corporation of Delaware
No Drawing. Continuation-in-part of application Ser. No. 505,737, Oct. 29, 1965. This application Mar. 9, 1967, Ser. No. 621,751
Int. Cl. A23g *3/00*
U.S. Cl. 99—134　　　　　　　　　　　　　　　6 Claims

ABSTRACT OF THE DISCLOSURE

A crystalline confection of sorbitol and mannitol prepared by seeding a substantially anhydrous melt of the ingredients and then allowing the seeded melt to solidify under controlled conditions of temperature and humidity.

---

This application is a continuation-in-part of my co-pending application, Ser. No. 505,737, filed Oct. 29, 1965, now abandoned.

This invention relates to confectionary compositions. More particularly, this invention relates to hard sugarless confections having a generally glass-like appearance. The invention further relates to hard sugarless confections which have a glass-like appearance and are substantially clear. The invention relates still further to methods of preparing such confections.

In recent years the confectionary industry has found it desirable for a variety of reasons to produce a confection called "sugarless hard candy" which resembles ordinary hard candy but is usually prepared from sorbitol, mannitol and other materials, including coloring and flavor, in the place of the sucrose, corn sugar, coloring and flavor normally used in the manufacture of hard candy. It is well known, however, that sugarless confections of the kind are extremely difficult to prepare owing to the disadvantages presented by the inherent tendency of the sugarless piece to remain soft or tacky instead of solidifying into a hard piece as desired. At the present time, hard confections made from sorbitol solution, crystalline sorbitol and crystalline mannitol usually include a gum, such as gumarabic, acacia or tragacanth, in order to promote the "setting-up" or solidification of the confection. Notwithstanding its inclusion for this purpose, however, the presence of the gum necessitates relatively low cooking temperatures and a relatively high moisture content in the solution from which the confection is prepared in order to keep the gum suspended therein. Because of these factors, the crystallization time for the confection is excessively long, frequently necessitating a delay of as much as several days in the processing time. Moreover, when the confection does crystallize, the clarity of the piece is destroyed owing to the presence of the colloidally dispersed gum and to the surface crystallization of the sorbitol and mannitol. The desirable optimum, therefore, is a sugarless confection which "sets-up" in a relatively short time into a hard solid piece and one which is also substantially clear or transparent.

It is, accordingly, an object of the present invention to provide a hard, clear sugarless confectionary composition which solidifies in a relatively short time.

It is another object of this invention to provide a hard sugarless confectionary composition having a clarity superior to ordinary confections of the kind and which is resistant to post-processing crystallization with consequent loss of clarity.

It is another object of this invention to provide a method of preparing a hard sugarless confectionary composition wherein the composition solidifies in a relatively short time.

It is another object of this invention to provide a method for preparing a hard sugarless confectionary composition which is substantially clear.

The foregoing objects and still further objects are broadly accomplished according to the present invention by providing a glass-like crystalline composition which consists essentially of sorbitol alone or sorbitol and mannitol in combination and which is substantially anhydrous. The sorbitol and mannitol used in the practice of the present invention may be initially in the crystalline forms thereof or in aqueous solution where practicable. Sorbitol and mannitol may be contained in the confectionary composition of the present invention in a ratio of one to the other within the approximate ranges indicated below in Table I:

Table I

|  | Parts by weight |
|---|---|
| Sorbitol | 75 to 100 |
| Mannitol | 0 to 25 |

The composition produced by the method of the present invention comprises crystalline sorbitol, or an intimate blend of crystalline sorbitol and mannitol, in a ratio within the approximate limits set forth in Table I, to which suitable flavors and colors may be added as desired. The composition, however, is substantially anhydrous in that the moisture content thereof ordinarily may not exceed a maximum of about 0.5% by weight thereof.

In accordance with the method of the present invention crystalline sorbitol or a combination of crystalline sorbitol and crystalline mannitol are preferably dissolved in an amount of water not more than sufficient to effect solvation of the crystals therein. Ordinarily the ratio of solids to liquid will be approximately about 2.33 parts by weight of solids to about 1 part by weight of water. The amount of water required for complete solution of a blend of crystalline sorbitol and mannitol will vary, however, upon the weight ratio of sorbitol to mannitol selected. The solution is then rapidly heated to the boiling temperature of the solution and cooking is continued with continual reduction of the moisture content to the temperature at which the moisture content of the solution does not exceed about 0.5% by weight thereof. Usually the cooking temperatures are maintained between a minimum of about 385° F. and a maximum of about 390° F. Vacuum cooking may be used to reduce charring effects.

When the moisture content of the solution has been reduced to about 0.5% by weight thereof, the solution is cooled with moderate agitation to a temperature suitable for seeding the solution with crystals to effect the crystallization thereof; the desired temperature, accordingly, lies within the range of about 150° F. to about 200° F. Since effective seeding of the solution with appropriate crystals is critical to the crystallization process, that is, to the solidification of the sorbitol or sorbitol/mannitol blend, seeding of the solution at temperatures substantially higher than about 200° F. will be less effective because the higher temperatures will cause at least some of the seeding crystals to melt, while seeding at temperatures substantially lower than about 150° F. will be less effective because the increased viscosity of the solution at such lower temperatures will tend to prevent thorough dispersion of the seeding crystals throughout the relatively viscous mass.

When the temperature of the solution has been reduced to an appropriate seeding temperature, the solution is seeded with a finely ground sorbitol/mannitol glass, or other appropriate seed, with constant agitation to assure that the seeding crystals are thoroughly dispersed throughout the solution. Ordinarily, in the practice of this invention from about ½% by weight of the composition to about 5% by weight thereof may be added in the form of seeding crystals. If seeding crystals in an amount of less than about ½% by weight of the composition are added, the crystallization of the solution into a glass-like solid is likely to be disadvantageously slow; if more than about 5% by weight of seeding crystals are added, the resulting viscous mixture is likely to be difficult to handle. In those cases where subsequent handling of the crystallizing solution is not important, even greater amounts of seeding crystals may be used. The speed with which solidification of the melt is accomplished depends upon the quantity of seeding material used, the degree of agitation, the particular blend of sorbitol and mannitol which may be used and the character of the seeding crystals themselves.

When the seeding material has been added, the solution is then placed in an environment maintained at a constant temperature within the range of about 80° F. to about 90° F., preferably from about 83° F. to about 87° F., and at a relative humidity not more than about 50%, preferably between about 30% and about 40%, until the solution crystallizes. The time required for crystallization of the solution may vary from as little as a few minutes to as much as several hours depending upon the conditions set forth above.

Preferably in the practice of this invention the seeding crystals used to effect solidification of the sorbitol solution or sorbitol/mannitol solution are of the same character as that of the solution with which used, i.e., a sorbitol solution is seeded with crystals of finely ground sorbitol and a solution which is a blend of sorbitol and mannitol is seeded with finely ground crystals the composition of which comprises sorbitol and mannitol in approximately the same proportions as that of the solution being seeded. This invention is not limited, however, to the use of seeding crystals which are substantially identical in their composition to that of the solution being seeded; on the contrary, other seeding crystals which contain no sorbitol or mannitol and are compositionally foreign in their character to that of the solution to be solidified may be used. Examples of other types of seeding crystals which may be used are finely ground crystals of dextrose, sucrose and other crystalline carbohydrates. The crystals should be sufficiently finely ground to pass through a 140 mesh screen.

Usually, after the seeding operation but before solidification of the melt into a hard piece has taken place, it will be desirable to pour the seeded melt into a suitable mold to shape the final piece. Decantation, of course, must be performed at a temperature at or above the flow point of the viscous mass. In practice it has been found that the melt is desirably cooled to about 150° F. prior to the decantation thereof, but ordinarily should not be cooled below about 140° F. for this purpose.

The following is a specific example of the preparation of a hard sugarless confectionary composition according to the method of the present invention:

EXAMPLE 1

80 grams of sorbitol and 20 grams of mannitol were dry mixed and added to 50 grams of water in a glass beaker. The solution was boiled for about 20 minutes until the temperature thereof reached 390° F. The solution was then cooled by stirring to 197° F. at which point 1.3 grams of seeding crystals made from a finely ground sorbitol/mannitol glass having the proportion of 95 parts by weight of sorbitol to 5 parts by weight of mannitol were added thereto and dispersed throughout the solution by agitation. The solution was poured into molds and then placed in a cabinet having controlled temperature and humidity and there maintained in an atmosphere in which the ambient temperature was 85° F. and the relative humidity 40% for a period of one hour. After one hour, the piece was totally solidified.

Frequently it is desirable to produce a confectionary composition which is substantially clear, i.e., unclouded, owing to the relative attractiveness of confections of such character. In accordance with the present invention, a hard sugarless confectionary composition which is substantially clear may be prepared by combining sorbitol and mannitol in the composition in a ratio of one to the other within the approximate ranges indicated below in Table II:

Table II

| | Parts by weight |
|---|---|
| Sorbitol | 89.0–92.5 |
| Mannitol | 7.5–11.0 |

It has been found that a clear confectionary composition containing sorbitol and mannitol within the critical limits set forth in Table II is much more resistant to subsequent crystallization at the surface thereof than blends of sorbitol and mannitol in any other proportion; indeed, the marked post-processing resistance to crystallization at the surface of blends of sorbitol and mannitol in ratios within the limits indicated in Table II significantly distinguishes such blends of sorbitol and mannitol from all other blends thereof which are substantially outside those limits and, accordingly, compositions containing blends of sorbitol and mannitol in ratios of one to the other within the ranges set forth in Table II constitute a significant improvement in the art.

To prepare a hard, clear sugarless confectionary composition according to the method of this invention, crystalline sorbitol and crystalline mannitol combined in a weight ratio within the ranges set forth in Table II are dissolved in not more than about sufficient water to effect solution of the crystalline mixture. Ordinarily, the ratio of solids to water will be about two parts by weight of solids to about one part by weight of water. The solution is then rapidly heated to the boiling temperature of the solution and cooking is continued with continual reduction of the moisture content to the temperature at which the moisture content of the solution does not exceed 0.5% by weight of the solution. Ordinarily, the minimum temperature required in the cooking process is about 385° F. and the maximum desirable temperature is about 390° F., if charring is to be avoided.

When the moisture content of the solution has been reduced to about 0.5% by weight thereof, the temperature is cooled slowly with moderate agitation to a temperature suitable for seeding the solution with crystals to effect the crystallization thereof, i.e., a temperature generally within the range of about 170° F. to about 197° F. Extreme care must be exercised to avoid incorporating any air into the hot melt during the cooling process. As the viscosity of the solution increases consequent upon a decrease in temperature during the subsequent seeding operation, entrapped air will be impossible to remove and will destroy the clarity of the confectionary composition. Vacuum cooking may be useful in eliminating air bubbles.

When the temperature of the solution has been reduced to a suitable seeding temperature, the solution is seeded with a finely ground sorbitol/mannitol glass which comprises sorbitol and mannitol in an approximate ratio of one to the other within the ranges indicated in Table II. Crystals of dextrose may also be used to seed the solution. Preferably seeding crystals are added to the solution in an amount within the range of about ½% by weight of the composition to about 5% by weight of the composition. During the seeding operation care must be exercised to insure maximum dispersion of the seeding crystals throughout the solution (by agitation) while keeping the incorporation of air thereinto at a minimum.

When the seeding material has been added to the solution, it is desirably, but not necessarily, cooled to about 150° F. In those instances in which it is desired to pour the solution into molds, the temperature of the solution should not be allowed to drop below about 140° F., the approximate flow point of the viscous mass.

When the temperature of the solution has been reduced to about 150° F., the solution is then placed in an environment maintained at a constant temperature within the range of about 83° F. to about 87° F. for a period of at least about 2 hours. The relative humidity of the environment should be maintained within a range of about 30% to about 40%. It is important that the ambient temperature lie within the range given, i.e., from about 83° F. to about 87° F., if a clear confectionary composition is to be obtained; substantial deviations from this range of temperatures will significantly reduce the clarity of the composition.

The following is a specific example of the preparation of a hard sugarless confectionary composition which is substantially clear in appearance:

EXAMPLE 2

92.15 grams of sorbitol and 7.85 grams of mannitol were dry mixed and added to 50 grams of water in a glass beaker. The solution was boiled for about 20 minutes until the temperature thereof reached 390° F. The solution was then cooled by stirring to 197° F. at which point 1.3 grams of seeding crystals made from a finely ground sorbitol/mannitol glass having the proportion of 95 parts by weight of sorbitol to 5 parts by weight of mannitol were added thereto and dispersed throughout the solution by agitation. The solution was poured into molds and then placed in a cabinet having controlled temperature and humidity and there maintained in an atmosphere in which the ambient temperature was 85° F. and relative humidity 40% for a period of one hour. After one hour, the piece was totally solidified and very clear.

Having thus described my invention, I claim:

1. A method of preparing a confectionary composition comprising the steps of heating an aqueous solution containing sorbitol and not more than about one-fourth part by weight of mannitol per unit weight of sorbitol to reduce the moisture content thereof to not more than about 0.5% by weight of said solution, cooling said solution to a temperature within the range of about 150° F. to about 200° F., seeding said solution with not less than about ½% by weight of said composition with crystals selected from the group consisting of finely ground crystalline sorbitol, mannitol and carbohydrates and placing said solution in an environment maintained at a constant temperature within the range of about 80° F. to about 90° F. and a relative humidity not greater than 50% until said solution crystallizes.

2. A method according to claim 1 wherein the temperature of said solution is maintained within a range from about 385° F. to about 390° F. in the first step thereof, wherein the composition of said seeding crystals is substantially the same as that of said solution and wherein said solution is maintained in an environment having a temperature within the range of about 83° F. to about 87° F. and a relative humidity within the range of about 30% to 40% in the final step thereof.

3. A method according to claim 1 wherein said solution is further cooled after seeding to a temperature above the flow point of said solution and then poured into molds prior to the crystallization thereof.

4. A method of preparing a confectionary composition, comprising the steps of heating an aqueous solution containing sorbitol and mannitol in a ratio of about 89.0 parts by weight to about 92.5 parts by weight of sorbitol and about 7.5 parts by weight to about 11.0 parts by weight of mannitol to reduce the moisture content thereof to not more than about 0.5% by weight of said solution, slowly cooling said solution while avoiding the incorporation of air thereinto to a temperature within the range of about 150° F. to about 200° F., seeding said solution while avoiding the incorporation of air thereinto by dispersing throughout said solution seeding crystals selected from the group consisting of a finely ground substantially glass-like crystalline blend of sorbitol and mannitol in a ratio of about 89.0 to 92.5 parts by weight of sorbitol to about 7.5 to 11.0 parts by weight of mannitol and dextrose in an amount not less than about ½% by weight of said composition and then placing said solution in an environment maintained at a constant temperature within the range of about 83° F. to about 87° F. and relative humidity not greater than 50% until said solution crystallizes.

5. A method according to claim 4 wherein subsequent to seeding and prior to crystallization of said solution, said solution is cooled to a temperature not less than about 140° F. and poured into molds.

6. A method according to claim 5 wherein said solution is heated in the first step to a temperature within the range of about 385° F. to about 390° F., wherein said solution in the second step is cooled to a temperature within the range of about 170° F. and 197° F., wherein the composition of said seeding crystals is substantially the same as that of said solution and wherein said solution is maintained at a relative humidity within the range of about 30% to about 40% in the final step thereof.

References Cited

UNITED STATES PATENTS 2,311,235    2/1943    Kuderman.

RAYMOND N. JONES, *Primary Examiner.*

STEVEN E. HEYMAN, *Assistant Examiner.*